United States Patent [19]
Mezey

[11] 3,808,479
[45] Apr. 30, 1974

[54] AIR DIELECTRIC CAPACITOR

[75] Inventor: Frank G. J. Mezey, Centerport, N.Y.

[73] Assignee: Victor Insetta, Westbury, N.Y.; a part interest

[22] Filed: Aug. 6, 1973

[21] Appl. No.: 386,052

[52] U.S. Cl. .............................. 317/251, 317/249 R
[51] Int. Cl. ............................................. H01g 5/14
[58] Field of Search ............. 317/249 R, 249 T, 251

[56] References Cited
UNITED STATES PATENTS

| 3,051,879 | 8/1962 | Lazar | 317/249 T |
| 3,239,730 | 3/1966 | Farago | 317/249 T |
| 3,483,450 | 12/1969 | Blickstein | 317/251 |

*Primary Examiner*—E. A. Goldberg

[57] ABSTRACT

A variable capacitor assembly includes a tubular insulative housing, a cylindrical stator electrode with concentric, radially spaced walls in the housing, a cylindrical conductive bushing axially aligned with the housing, a cylindrical movable electrode with concentric, radially spaced walls in the bushing, and a drive screw captured by the bushing and engaging the movable electrode to advance and retract it axially with respect to the movable electrode when the screw is turned. The movable electrode has polygonal head slidably received by a corresponding polygonal bore in the bushing to prevent turning of the movable electrode and to provide electrical and mechanical contact therebetween. The parts of the assembly may be manufactured from a solid, readily machinable metal, and if desired plated with a noncorrosive metal. An insulative sleeve in the stator electrode serves as a guide for axial movement of the movable electrode, and has an annular flange which serves as an abutment to stop inward movement of the movable electrode.

10 Claims, 4 Drawing Figures

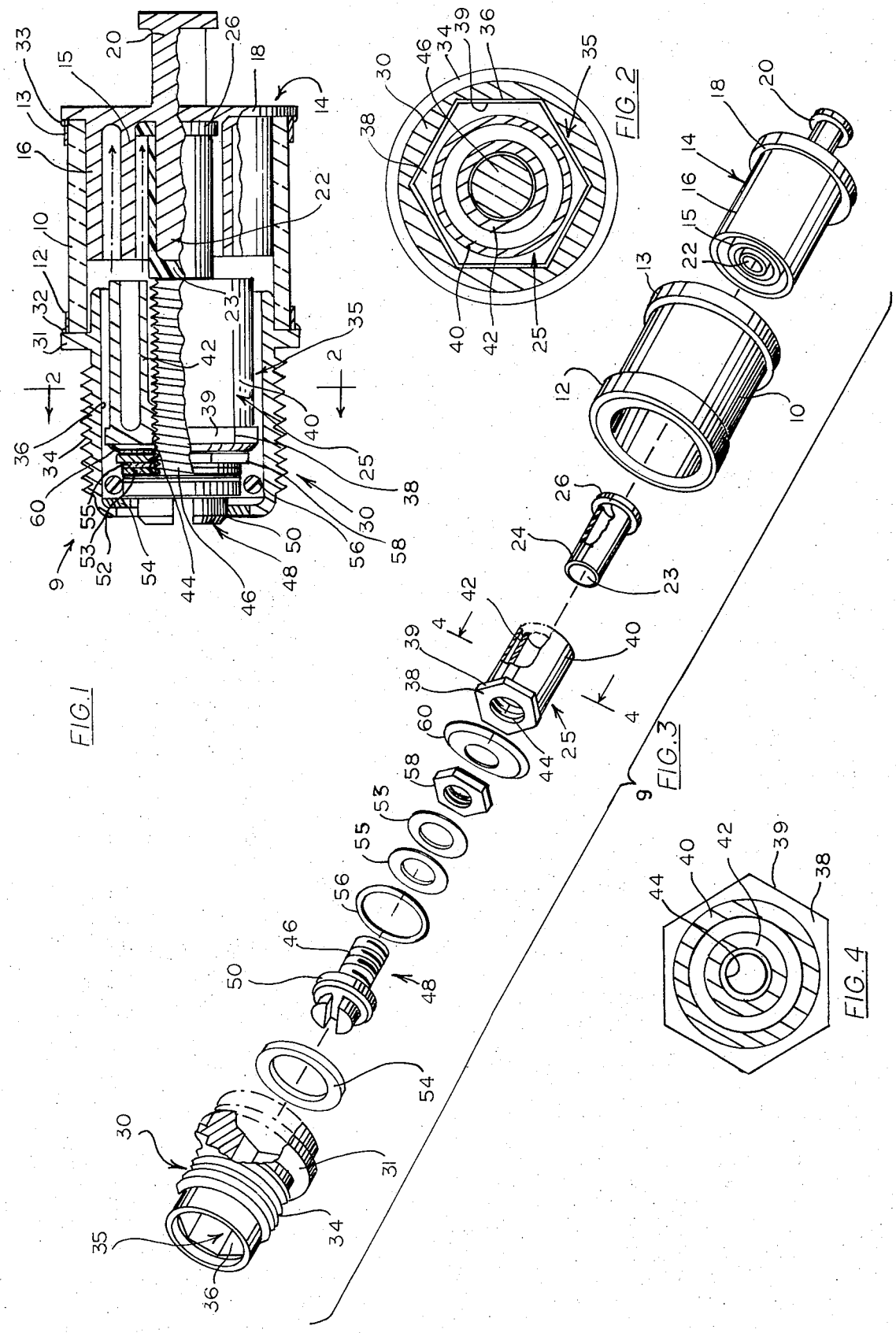

AIR DIELECTRIC CAPACITOR

This invention concerns an improved variable capacitor of the miniature type, and more particularly concerns improvements in an air dielectric adjustable capacitor.

In one type of an air dielectric adjustable capacitor precision die cast metal parts are employed for both the stator and movable electrodes which are manufactured from a low melting point alloy metal. The tooling for such construction is necessarily quite expensive. Some prior art capacitor assemblies further employ a contact spring to manufacture electrical contact between the inner movable electrode and the outer conductive shell. This spring is inductive and under conditions of severe vibration, the spring loaded electrical contact may become erratic.

The present invention involves a number of improvements over prior art capacitors. The cylindrical stator or fixed electrode and the cylindrical movable electrodes are both machined from solid metal such as brass or aluminum. A plastic spacer is employed as a stop or abutment for the movable electrode at maximum capacitance setting. The movable electrode has a hexagonal head, the six edges of which slidably interfit with the sides of a hexagonal bore in an outer bushing or shell. This arrangement makes it possible to avoid a contact spring, since mechanical and electrical contact between movable and fixed electrodes is always maintained under all operational conditions. Adjustment of capacitance is effected by rotation of a screw in the movable electrode to retract and advance the movable electrode axially. In order to control backlash and to prevent torque vibrations from changing the set position of the screw, there is provided a bevel washer bearing on the head of the movable electrode and a locknut bearing on the washer.

Accordingly, a primary object of the present invention is to provide a miniature variable capacitor assembly having a large reliability in performance.

Another object of the present invention is to provide a miniature variable capacitor assembly which is machined from a solid metal and thereby lower the cost of manufacture.

These and other objects and many of the attendant advantages of this invention will be readily appreciated as the same becomes better understood by reference to the following detailed description when considered in connection with the accompanying drawings in which:

FIG. 1 is an axial sectional view of a variable capacitor embodying the invention;

FIG. 2 is a cross sectional view taken along line 2—2 of FIG. 1;

FIG. 3 is an exploded perspective view of parts of the capacitor; and

FIG. 4 is a cross sectional view on an enlarged scale of the movable electrode, taken along line 4—4 of FIG. 3.

Referring now to the drawings wherein like reference characters designate like or corresponding parts throughout, there is illustrated a capacitor assembly generally designated by reference numeral 9 which includes a cylindrical housing 10 made of insulative material such as ceramic. The housing 10 is metallized at its ends 12 and 13. Positioned within the housing 10 is a stator capacitor electrode 14, formed with radially spaced inner and outer concentric walls or sleeves 15, 16 extending from and integral with a circular end plate 18. A stud 20 extends axially out of the end plate 18 and serves as an electrical terminal for the capacitor 9. The outer sleeve 16 is surrounded by the ceramic housing 10. The stator electrode 14 is further formed with an axial post 22 on which is positioned a plastic tubular guide sleeve or bushing 24 made of a very smooth, self-lubricated material such as nylon or fluorethylene. The bushing sleeve 24 has a closed end 23 and at its other end terminates in an annular flange 26 which serves as an abutment for an axially slidable movable electrode 25.

The electrode 25 slides axially in an outer shell or bushing 30 which is positioned in axial alignment with the electrode 14. The bushing 30 has an annular flange 31 which abuts one end of the housing 10 while the annular head plate 18 abuts the one end of the housing 10 while the annular head plate 18 abuts the other end of the housing 10. Solder 32, 33 may be applied to the respective metallized ends 12 and 13 to secure the bushing, 30 to the stator electrode 14 in axial alignment. The bushing 30 has an external thread 34 for mounting the capacitor 9 on a panel or other support of electrical apparatus of which the capacitor assembly 9 forms a part. The bushing 30 has a polygonal bore 35 with six smooth sides 36 to receive the electrode 25. The movable electrode 25 has a hexagonal head 38 with six faces 39 which fits slidably and snugly in the bushing 30 to provide good electrical contact between the six faces 39 of the head 38 and the six sides 36 of the bore 35. The electrode 25 has two radially spaced concentric cylindrical wall or sleeves 40, 42 which fit inside of and are radially spaced from sleeves 16 and 15 respectively of the electrode 14. The post 22 carrying the insulative sleeve or bushing 24 fits inside of the sleeve 42 and serves as a guide for the movable electrode 25. When the movable electrode 25 is fully nested in the electrode 14 to achieve maximum capacitance of the assembly, the free end of the sleeve 42 abuts the end flange 26 of the bushing 24. The head 38 of the electrode 25 is formed with a threaded hole 44 which receives a threaded shank 46 of an adjustment or tuning screw 48. The screw 48 has a slotted head 50 which is externally exposed at the outer end of the bushing 30 where it may be engaged by a screwdriver for turning thereof.

The head 50 of the screw 48 is held inside the bushing 30 by an annularly turned in lip 52 which is formed after the parts of the assembly are inserted inside the bushing 30. Just inside of lip 52 is a flat washer 54. Surrounding the head 50 of the screw 48 is a resilient, sealing O-ring 56. A flat teflon washer 55 abuts the bottom of the head 50 of the screw 48 and adjacent thereto is a brass washer 53. Engaged on the shank 46 of the screw 48 is a nut 58 which is hexagonal and fits slidably inside the bushing 30. The nut 58 bears against a bevel washer 60 which in turn bears against the outer side of the electrode head 38. Before assembly of the capacitor 9, the O-ring 56 is mounted on the head 50 of the screw 48 and the washers 55 and 53 are mounted on the screw shank 46 and then the nut 58 is screwed onto the shank 46 which is then inserted in the threaded hole 44 of the head 38. Tightening the nut 58 presses and sets the bevel washer 60 against the electrode head 38 and thereby prevents backlash between the movable electrode 25 and the adjustment screw 48. Subsequent vibration cannot dislodge the screw 48 from the set position with respect to the movable electrode 25, so that any capacitance setting of the movable electrode 25 with respect to the stator electrode 14 is thereafter maintained. The head 50 of the screw 48 will serve as a stop or abutment for the movable electrode 25 in its fully withdrawn position with respect to the stator electrode 14. At this position of minimum capacitance the nut 58 will contact the washer 53.

The operational capacitance is established between the movable electrode 25 and the stator electrode 14, by electrical connections to the bushing 30 and the stud 20. The spun or turned in lip 52 holds the drive screw 48, the O-ring 56, the washers 53 and 55, the nut 58, the bevel washer 60, and the movable electrode 25 inside the bushing or shell 30. Very minute, precise variations of capacitance may be made by turning the screw 48 which maintains its set position due to the absence of backlash insured by the bevel washer 60 and the nut 58.

The several metal parts of the capacitor assembly are preferably made by machining relatively soft metal such as brass or aluminum which may then be gold plated. This will insure that the assembly remains free of corrosion thereafter. Machining the parts reduces manufacturing costs as compared with precision die-casting previously employed in the manufacturing of this type of capacitor. Omission of the formerly used contact springs further lowers assembly costs. The capacitor of the present invention, thus can be manufactured at low cost, while providing great reliability of performance.

It should be understood that the foregoing relates to only a preferred embodiment of the invention, and that it is intended to cover all changes and mofifications of the example of the invention herein chosen for the purpose of the disclosure, which do not constitute departures from the spirit and scope of the invention.

The invention claimed is:

1. A variable capacitor assembly, comprising:
a tubular insulative housing;
a cylindrical stator electrode axially positioned within the housing;
a cylindrical bushing axially aligned with said housing and stator electrode;
a cylindrical axially movable electrode positioned axially within said bushing;
said movable electrode having a polygonal head with flat faces said bushing having a corresponding polygonal bore with smooth sides slidably and snugly receiving said polygonal head so that said faces of said head mechanically and electrically contact said smooth sides of said bore to prevent said movable electrode from turning;
a rotatable drive screw having a shank engaged with said polygonal head for axially advancing and retracting said movable electrode with respect to said stator electrode, and having a head rotatably engaged by said bushing to retain said screw in said bushing.

2. A variable capacitor assembly as defined in claim 1, wherein said stator electrode and said movable electrode each have concentric inner and outer cylindrical walls, said walls of said movable electrode interfitting within said walls of said stator electrode in radial spaced relationship to define a capacitance with air dielectric therebetween, said stator electrode having an integral axial center post, said assembly further comprising an insulative sleeve on said post for slidably guiding said movable electrode in axial movement, said sleeve having an annular flange at one end serving as an abutment for stopping axial movement of said movable electrode when fully nested within said stator electrode.

3. A variable capacitor assembly as defined in claim 1, further comprising a bevel washer on said shank of said screw having one side bearing against said head of said movable electrode; and a polygonal nut having sides corresponding to said polygonal head of said movable electrode, said nut being mounted on said shank of said screw and bearing against the other side of said washer to set the torque between said nut and said movable electrode thereby preventing backlash thereinbetween and maintaining said movable electrode in a fixed position with respect to said stator electrode whereby said nut and said electrode engage the sides of said bore of said bushing to prevent rotation thereinbetween when said screw is turned.

4. A variable capacitor assembly as defined in claim 3, wherein said stator electrode and said movable electrode each have concentric inner and outer cylindrical walls, said walls of said movable electrode interfitting within said walls of said stator electrode in radial spaced relationship to define a capacitance with air dielectric therebetween, said stator electrode having an integral axial central post, said assembly further comprising an insulative sleeve on said psot post slidably guiding said movable electrode in axial movement, said sleeve having an annular flange at one end serving as an abutment for stopping axial movement of said movable electrode when fully nested within said stator electrode.

5. A variable capacitor assembly as defined in claim 4, wherein said bushing, said stator electrode and said movable electrode are all machined parts made from a solid metal.

6. A variable capacitor assembly as defined in claim 1, wherein said bushing, said stator electrode and said movable electrode are all machined parts made from a solid metal.

7. A variable capacitor assembly as defined in claim 1, whereinsaid polygonal head of said movable electrode, said polygonal nut and said polygonal bore of said bushing are hexagonal in shape so that there are six faces of said head and six sides of said nut contacting the six sides of said bore to insure mechanical and electrical contact between said movable electrode and said bushing at all times under all operating conditions.

8. A variable capacitor assembly as defined in claim 6, wherein said stator electrode and said movable electrode each have concentric inner and outer cylindrical walls, said walls of said movable electrode interfitting within said walls of said stator electrode in radial spaced relationship to define a capacitance with air dielectric therebetween, said stator electrode having an integral axial center post, said assembly further comprising an insulative sleeve on said post for slidably guiding said movable electrode in axial movement, said sleeve having an annular flange at one end serving as an abutment for stopping axial movement of said movable electrode when fully nested within said stator electrode.

9. A variable capacitor assembly as defined in claim 7, further comprising a bevel washer on said shank of said screw having one side bearing against said head of said movable electrode; and a polygonal nut having sides corresponding to said polygonal head of said movable electrode, said nut being mounted on said shank of said screw and bearing against the other side of said washer to set the torque between said nut and said movable electrode thereby preventing backlash therein between and maintaining said movable electrode in a fixed position with respect to said stator electrode whereby said nut and said electrode engage the sides of said bore of said bushing to prevent rotation thereinbetween when said screw is turned.

10. A variable capacitor assembly as defined in claim 8, wherein said bushing, said stator electrode and said movable electrode are all plated with a noncorrosive metal.

* * * * *